United States Patent
Missotten et al.

(10) Patent No.: US 10,551,402 B2
(45) Date of Patent: Feb. 4, 2020

(54) AIR SENSOR SYSTEM

(71) Applicant: CNH Industrial America LLC, New Holland, PA (US)

(72) Inventors: Bart M. A. Missotten, Herent (BE); Glenn Aesaert, Izegem (BE); Michael Carpentier, Varsenare (BE); Dré W. J. Jongmans, AG Klundert (NL); Brecht Vanmullem, Koekelare (BE); Karel M. C. Viaene, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/628,048

(22) Filed: Jun. 20, 2017

(65) Prior Publication Data
US 2017/0370959 A1 Dec. 28, 2017

(30) Foreign Application Priority Data

Jun. 22, 2016 (BE) .................. 2016/5457

(51) Int. Cl.
*G01F 1/34* (2006.01)
*G01P 5/14* (2006.01)
*B01D 46/00* (2006.01)
*B01D 46/44* (2006.01)
*G01F 1/684* (2006.01)
*G01L 19/06* (2006.01)

(52) U.S. Cl.
CPC ............ *G01P 5/14* (2013.01); *B01D 46/0002* (2013.01); *B01D 46/444* (2013.01); *B01D 46/446* (2013.01); *G01F 1/34* (2013.01); *G01F 1/6842* (2013.01); *G01L 19/0636* (2013.01); *G01L 19/0645* (2013.01)

(58) Field of Classification Search
CPC .................. G01F 1/34; G01F 1/68; G01P 5/14
See application file for complete search history.

(56) References Cited

U.S. PATENT DOCUMENTS

| 2,747,407 | A | 5/1956 | Knoll |
| 4,912,981 | A | 4/1990 | King |
| 5,692,637 | A | 12/1997 | Hodge |
| 5,992,239 | A | 11/1999 | Boehringer et al. |
| 6,422,085 | B1 | 7/2002 | Hegner et al. |
| 6,972,115 | B1 * | 12/2005 | Ballard .................. B01J 19/088 422/186.04 |

(Continued)

FOREIGN PATENT DOCUMENTS

| DE | 4235684 A1 | 4/1994 |
| DE | 202004001139 U1 | 4/2004 |

(Continued)

OTHER PUBLICATIONS

Extended European Search Report for EP17176696.7, dated Nov. 7, 2017 (8 pages).

*Primary Examiner* — Jewel V Dowtin
(74) *Attorney, Agent, or Firm* — Peter K. Zacharias; Patrick M. Sheldrake

(57) ABSTRACT

An air sensor system including a pressure or airflow sensor, a filter housing that defines an air flow path to the air pressure sensor, and a filter in the air flow path. The filter includes a micro filter and a hydrophobic membrane. The hydrophobic membrane is downstream of the micro filter in the air flow path to the pressure or airflow sensor.

14 Claims, 2 Drawing Sheets

(56) References Cited

U.S. PATENT DOCUMENTS

| | | | |
|---|---|---|---|
| 8,122,765 B2 | 2/2012 | Brechbuhl et al. | |
| 8,915,624 B2* | 12/2014 | Manahan | F21V 29/20 |
| | | | 362/373 |
| 9,526,211 B2 | 12/2016 | Murray et al. | |
| 2003/0005772 A1 | 1/2003 | Hegner et al. | |
| 2004/0019313 A1* | 1/2004 | Childers | A61M 1/1696 |
| | | | 604/5.01 |
| 2007/0151231 A1* | 7/2007 | Rinaldi | F01N 3/0211 |
| | | | 60/286 |
| 2008/0269679 A1* | 10/2008 | Arnold | A61F 7/0085 |
| | | | 604/122 |
| 2010/0269583 A1* | 10/2010 | Jasnie | F02M 35/024 |
| | | | 73/198 |
| 2012/0161596 A1* | 6/2012 | Manahan | H02B 1/28 |
| | | | 312/236 |
| 2015/0112265 A1* | 4/2015 | Tsoukalis | A61M 5/16822 |
| | | | 604/151 |
| 2015/0346174 A1* | 12/2015 | Beaulieu | G01N 1/2205 |
| | | | 128/206.17 |
| 2016/0059171 A1* | 3/2016 | Lukasavitz | G01F 1/6842 |
| | | | 96/422 |
| 2016/0146655 A1* | 5/2016 | Gardiner | G01F 23/02 |
| | | | 73/323 |
| 2017/0002821 A1* | 1/2017 | Claussen | G01M 15/14 |

FOREIGN PATENT DOCUMENTS

| | | |
|---|---|---|
| DE | 102013213482 A1 | 1/2015 |
| GB | 1104231 A | 2/1968 |
| GB | 2130375 A | 5/1984 |
| GB | 20130375 A | 5/1984 |
| WO | 2008004862 A1 | 1/2008 |
| WO | 2013110639 A1 | 8/2013 |

* cited by examiner

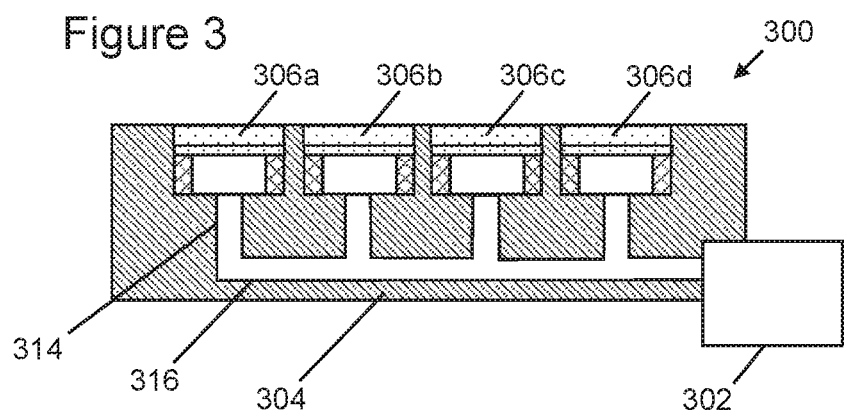

AIR SENSOR SYSTEM

CROSS REFERENCE TO RELATED APPLICATION

This application claims priority to Belgium Application No. 2016/5457 filed Jun. 22, 2016, the contents of which are incorporated herein by reference.

BACKGROUND OF THE INVENTION

In agricultural machines such as combine harvesters, air measurements can be taken by pressure or airflow sensors, for example in a cleaning system of the machine. In such airflow sensors, the measuring principle is important for the outcome of the measurements, and therefore the airflow through or into the sensor should be representative of the pressure or airflow that is to be measured.

Water and dust however can damage the sensor and thus should be prevented from reaching the sensor itself. In particular, if an operator cleans the machine with a high pressure washer, the high pressure water can damage the airflow sensor. In some examples, it may not be acceptable to place a protection plate before the airflow sensor because doing so can influence the pressure measurements due to air turbulence around the protection plate.

SUMMARY OF THE INVENTION

According to a first aspect of the invention there is provided an air sensor system comprising:
- a pressure or airflow sensor;
- a filter housing that defines an air flow path to the air pressure sensor; and
- a filter in the air flow path, wherein the filter comprises:
  - a micro filter; and
  - a hydrophobic membrane, wherein the hydrophobic membrane is downstream of the micro filter in the air flow path to the pressure or airflow sensor.

Use of such a filter can advantageously protect the pressure or airflow sensor from both dust and high pressure water.

The micro filter may comprise a sintered material filter. The micro filter can have openings of the order of 0.1 μm to 20 μm. The micro filter may have a water entry pressure characteristic of the order of 0.1 bar.

The hydrophobic membrane may have a water entry pressure characteristic of the order of 1 to 10 bar.

The hydrophobic membrane may be a shorter distance away from the pressure or airflow sensor than the micro filter along the air flow path to the pressure or airflow sensor.

The micro filter and the hydrophobic membrane may cover substantially the entire cross-sectional area of the air flow path. The cross-section may be in a direction that is transverse to the direction of air flow through the filter.

The micro filter and the hydrophobic membrane may be adjacent to each other. The micro filter and the hydrophobic membrane may be in direct physical contact with each other.

The filter housing may have a recess. The filter may be located in the recess.

The air sensor system (100) may further comprise a seal, which may be located in the recess between the filter housing and a downstream surface of the filter. A thickness of the seal may define a tapering profile as it extends away from the filter. The seal may comprise one or more ribs that extend away from, and around, an outer surface of the seal, in order to engage with the filter housing.

An upstream surface of the filter may be flush with an outer surface of the filter housing.

The air sensor system may comprise a plurality of filters located in the filter housing. Downstream of each of the plurality of filters, there may be provided a filter-conduit that connects to a common sensor-conduit. The sensor-conduit may be in fluid communication with the pressure or airflow sensor.

The air sensor system may be for an agricultural machine. There may be provided an agricultural machine comprising one or more of any of the air sensor systems disclosed herein. The agricultural machine may be a combine harvester, a forage harvester, a baler, a grape harvester, a seeder or a planter.

There may also be provided a filter for placing in an air flow path, wherein the filter comprises a micro filter and a hydrophobic membrane. The hydrophobic membrane may be configured to be located downstream of the micro filter in the air flow path. The filter may be provided independently of a sensor or any other components.

BRIEF DESCRIPTION OF THE DRAWINGS

Embodiments of the present invention will now be described by way of example and with reference to the accompanying drawings in which:

FIG. 3 shows a cross-sectional schematic view of an air pressure sensor system that includes a plurality of filters.

DETAILED DESCRIPTION OF THE DRAWINGS

Figure 1:
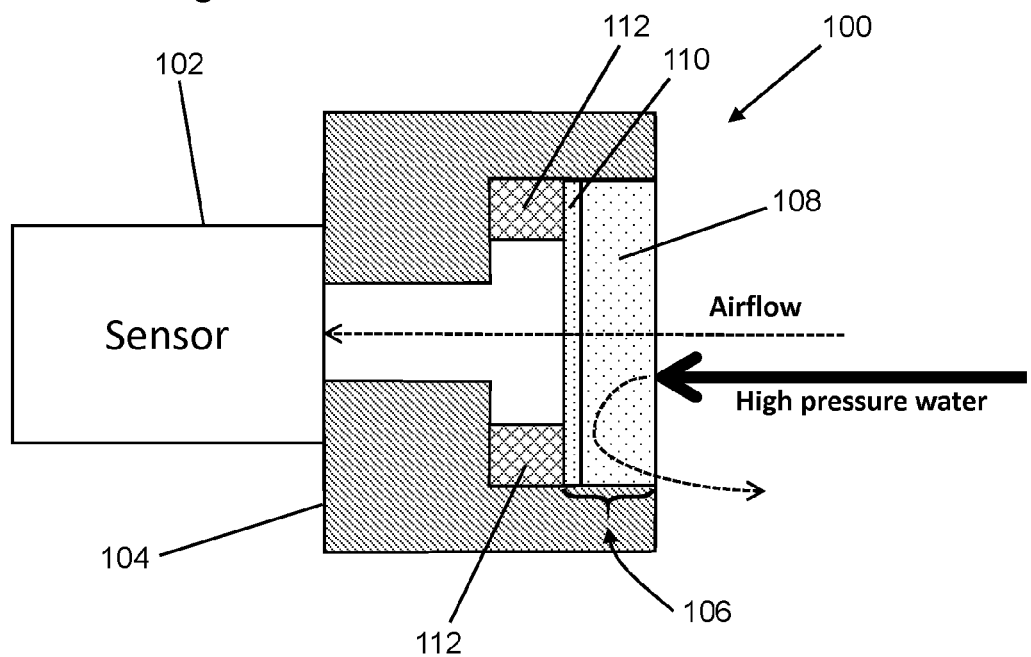
FIG. 1 shows a cross-sectional schematic view of an air pressure sensor system that is suitable for use in an agricultural machine.

FIG. 1 shows a cross-sectional schematic view of an air sensor system 100 that is suitable for use in an agricultural machine. For example, the air sensor system 100 may be used in a cleaning system of a combine harvester, and can be sufficiently durable and robust to measure sieve-off losses (that is, losses associated with the sieves in the combine harvester) or blowout losses (that is, losses associated with material that is blown out of the combine harvester). The environment in which these measurements are taken can be very dusty. Also, as discussed above, the air sensor system 100 may be exposed to high pressure water when the combine harvester is cleaned.

In this example the air sensor system is an air pressure system 100 that includes an air pressure sensor, although in other examples the air sensor system may include a different type of air sensor, such as an airflow sensor.

The air pressure sensor system 100 includes a pressure sensor 102. The pressure sensor 102 can be any type of sensor, for example it may be a thermal mass flow sensor, a membrane sensor, a hot or cold wire sensor or a vortex sensor. The air pressure sensor system 100 also includes a filter housing 104, which defines an air flow path to the pressure sensor 102. A filter 106 is located in the air flow path. As will be discussed below, advantageously the filter 106 can protect the pressure sensor 102 from both dust and high pressure water.

The filter 106 includes a sintered material filter 108 and a hydrophobic membrane 110. The sintered material filter 108 is an example of a micro filter. The hydrophobic membrane 110 is downstream of the sintered material filter 108 such that airflow passes through the sintered material filter 108 before it passes through the hydrophobic membrane 110 on its way to the pressure sensor 102. In this way, the hydrophobic membrane 110 is a shorter distance away from the pressure sensor 102 than the sintered material filter 108, along the air flow path to the pressure sensor 102. Also, the sintered material filter 108 and the hydrophobic membrane 110 cover substantially the entire cross-sectional area of the air flow path, where the cross-section is in a direction that is transverse to the direction of air flow through the filter 106.

Any micro filter may be used, for example any filter that has openings/pores of the order of 20, 10, 5, 3, 1 or 0.1 μm. The micro filter may have a "water entry pressure" (WEP) characteristic that defines the pressure that is needed to make the water pass through the filter. The micro filter may have a WEP of the order of 0.1 bar. The micro filter may comprise a sintered material filter 108, in that it may be made from a sintered material such that is has the desired pore size. The sintered material filter may be a bronze sintered filter, sintered metal filter, or an HDPE filter (sintered polyethylene) as non-limiting examples.

In this example, the sintered material filter 108 comprises a metal that has openings that are 3 μm, and can reduce the pressure of high pressure water from 100 bar on an upstream surface of the sintered material filter 108, to less than 1 bar on a downstream surface of the sintered material filter 108. In such an example, any water that is temporarily retained in the sintered material filter 108 may have substantially left the filter 106 about 20 minutes after the high pressure water is removed. This can be considered quickly enough for some applications.

The hydrophobic membrane 110 may be made of Polyester, PTFE, nylon, polypropylene, hydrophobic and oleophobic materials, as non-limiting examples. Of course, other membrane materials can be used that have a satisfactorily high resistance to water, and a satisfactorily low resistance to air. In this example, the hydrophobic membrane 110 can withstand water that comes through the sintered material filter 108 at pressures of up to about 1 bar. That is, the hydrophobic membrane 110 may have a "water entry pressure" (WEP) characteristic of about 1 bar, which means that the surface tension of the membrane 110 is broken at 1 bar such that water at a higher pressure than this can get through the membrane 110. In other examples, a hydrophobic membrane 110 that can hold back water at pressures of up to 2, 5, 6, or 10 bar can be used, as non-limiting examples.

The hydrophobic membrane 110 in this example is defined with a flowrate of 26 l/min/cm$^2$/bar. It will be appreciated that in some applications the hydrophobic membrane 110 should have as high a flow rate as possible, such that the pressure sensor 102 can take a more accurate reading.

The sintered material filter 108 can cope well with dust and water at low pressures, in that it can sufficiently impede or prevent the flow of dust and low pressure water through the sintered material filter 108. However, the sintered material filter 108 may allow high pressure water to pass through it, for example when an operator cleans his combine harvester with a high pressure washer. Nonetheless, the sintered material filter 108 may not be damaged by the impact of high pressure water, even if it does not completely hold the water back.

The hydrophobic membrane 110, in contrast, may not be able to cope with the impact of high pressure water (in that the impact may damage the membrane 110), although it can have a good resistance towards water ingress (especially under lower pressures).

By placing the hydrophobic membrane 110 behind the sintered material filter 108, as shown in FIG. 1, the sintered material filter 108 is put on the pressure impact side of the filter 106. The water therefore collides with the sintered material filter 108 at a high pressure. The water can pass through the sintered material filter 108, but is at a much lower pressure on a downstream face of the sintered material filter 108. The hydrophobic membrane 110, which is placed behind the sintered material filter 108, may not be damaged or broken as a result of high pressure because the pressure of the water that has come through the sintered material filter 108 has been sufficiently reduced. Also, the hydrophobic membrane 110 is able to hold back the water at that pressure, and therefore the water is sufficiently well impeded/prevented from passing through the filter 106 to the sensor 102.

By combining the two different filter types (the sintered material filter 108 and the hydrophobic membrane 110) as shown in FIG. 1, the downstream pressure sensor 102 can advantageously be adequately protected from both dust and high pressure water. Also, the combined filter 106 can provide a low resistance to air flow, and therefore can enable an accurate pressure measurement to be taken. This low resistance to airflow and high resistance to water ingress was previously a very hard combination to achieve. Furthermore, the filter 106 of FIG. 1 can be a simple solution using existing materials, and therefore can be a relatively low cost solution. Yet further still, the filter 106 can beneficially be compact. For example, it may be smaller than a filter that uses an extended serpentine flow path to filter out unwanted material.

In this example, the sintered material filter 108 and the hydrophobic membrane 110 are combined as a single filter element 106. After the filter element 116 is sprayed with water, it may take some time for the water to migrate out of the sintered material filter 108. This removal of water may be principally due to evaporation, and may be through an outer (upstream) surface of the sintered material filter 108 such that the water is still not able to reach the pressure sensor 102 as it is removed.

Advantageously, there is not a big volume/open space between the sintered material filter 108 and the hydrophobic membrane 110. In this example, the sintered material filter 108 and the hydrophobic membrane 110 are adjacent to each other such that they are in direct physical contact with each other. By pressing the hydrophobic membrane 110 against the sintered material filter 108, the volume of an open space between these two components can be minimized. Having a relatively small open space between the sintered material filter 108 and the hydrophobic membrane 110 can assist with reducing a dry out time of the filter 106. If there were a large open space, then that volume could fill up with water following cleaning with high pressure water, and it would likely take longer for the water to migrate out of the sintered material filter 108.

As shown in FIG. 1, the filter 106 is located in a recess in the filter housing 104. In this example the width of the recess, and therefore the width of the filter 106 is about 7 to 12 mm. The depth of the recess is greater than the thickness of the filter 106 such that a seal 112, such as a rubber sealing element, can be located in the recess between the filter housing 104 and a downstream surface of the filter 106. More particularly, the seal 112 can be located between the filter housing 104 and a downstream surface of the hydrophobic membrane 110. The seal 112 can be used to reduce/prevent air and other materials from passing around the sides of the filter 106, without passing through the filter 106.

The upstream surface of the filter 106, more particularly, the upstream surface of the sintered material filter 108, is flush with an outer surface of the filter housing 104 in this example. In this way, an accurate representation of air pressure can be measured because there will be limited interruptions to the airflow passing through the filter 106 to the pressure sensor 102. In contrast, if there were any discontinuities in the geometry of the outer surface of the air pressure sensor system 100, this could cause turbulence and could affect the accuracy of the pressure measurement taken by the pressure sensor 102.

Figure 2:
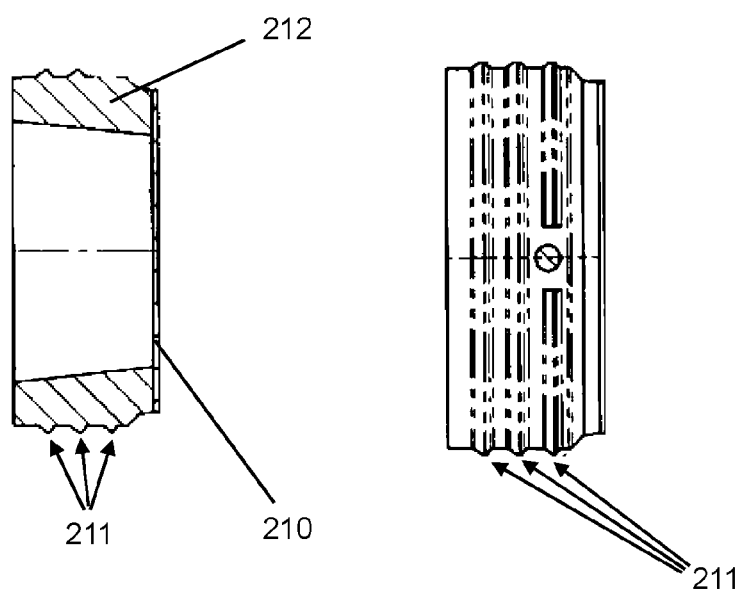
FIG. 2 shows another example of a seal and a hydrophobic membrane that can be used in the air pressure sensor system of FIG. 1.

FIG. 2 shows another example of a seal 212 and a hydrophobic membrane 210 that can be used in the air pressure sensor system of FIG. 1. A cross-sectional view and a side view are shown in FIG. 2. The seal 212 has one or more ribs 211 that extend away from, and around, an outer surface of the seal 212, in order to engage with the filter housing (not shown). In this way, a good seal can be made with the filter housing so that water and air cannot pass by the sides of the seal 212. In this example, three ribs 211 are used to provide three obstacles for the water or air to get passed.

In this example, the thickness of the seal 212 defines a tapering profile as it extends away from the hydrophobic membrane 210. In this way, the air flow path has an expanding profile as it extends downstream of the hydrophobic membrane 210. That is, the cross-sectional area of the seal 212 increases as the distance from the hydrophobic membrane 210 decreases. In this way, the surface area of the seal 212 that is to be fixed to the membrane can be sufficiently large.

FIG. 3 shows a cross-sectional schematic view of an air pressure sensor system 300 that includes a plurality of filters, in this example four filters 306a, 306b, 306c, 306d are located in the filter housing 314. Downstream of each of the filters 306 is a filter-conduit 314 that connects to a common sensor-conduit 316. The sensor-conduit 316 is in fluid communication with a pressure sensor 302. In this way, air flow that passes through each filter 306 is communicated to the pressure sensor 302 via a local filter-conduit 314 and the common sensor-conduit 316.

The example of FIG. 3 can be advantageous because the surface area of the filter 306 that is exposed to the air that is to be sensed is greater than is the case for the example of FIG. 1. Therefore, a higher volume of air flow can be made available to the pressure sensor 302 for measuring the air pressure.

One or more of the filters described herein may have a round/circular shape, when viewed from the top as they are shown in FIG. 3, and therefore any corresponding recesses in a filter housing may have the same shape. However, other shapes can be used, such as elliptical, square and rectangular.

The implementation of FIG. 3 can be particularly advantageous for applications that do not have much available space in terms of height (as it is shown in FIG. 3), but do have available space in terms of width. Furthermore, the use of circular filters 306 can be particularly good for achieving good sealing, and therefore the example of FIG. 3, which uses circular filters 306, can be considered advantageous over a single big rectangular filter block.

It will be appreciated that the pressure sensor 302 need not be directly mounted to the filter housing 302. In some examples, the component labelled with reference 302 in FIG. 3 may be considered as a measuring point, which is in fluid communication with a remote pressure sensor. For example, the measuring point may be connected to a remote pressure sensor with flexible tubing.

There may also be provided an agricultural machine, such as a combine harvester, a forage harvester, a baler, a grape harvester, a seeder and a planter that includes one or more of the air sensor systems described herein. The air sensor system may be located in a cleaning system, for example a first air pressure sensor system may be located on a first side of a sieve, and a second air pressure sensor system may be located on a second side of the sieve, such that a pressure differential across the sieve can be measured. It will be appreciated that any of the air sensor systems disclosed herein can be associated with any element or mechanical structure, and that it is not limited to use with sieves.

The invention claimed is:

1. An air sensor system comprising:
   a pressure or airflow sensor;
   a filter housing that defines an air flow path to the air pressure sensor; and
   a filter in the air flow path, the filter comprising;
      a micro filter; and
      a hydrophobic membrane downstream of the micro filter in the air flow path to the pressure or airflow sensor;
      wherein the micro filter and the hydrophobic membrane are physically adjacent to each other.

2. The air sensor system of claim 1, wherein the micro filter comprises a sintered material filter.

3. The air sensor system of claim 1, wherein the micro filter has openings of the order of 0.1 μm to 20 to μm.

4. The air sensor system of claim 1, wherein the micro fitter has a water entry pressure characteristic of the order of 0.1 bar.

5. The air sensor system of claim 1, wherein the hydrophobic membrane has a water entry pressure characteristic of the order of 1 to 10 bar.

6. The air sensor system of claim 1, wherein the micro filter and the hydrophobic membrane are in direct physical contact with each other.

7. An air sensor system comprising:
   a pressure or airflow sensor;
   a fitter housing that defines an air flow path to the air pressure sensor; and
   a filter in the airflow path, the filter comprising:
      a micro filter; and
      a hydrophobic membrane downstream of the micro filter in the air flow path to the pressure or airflow sensor:
   wherein the filter housing has a recess, and the filter is located in the recess.

8. The air sensor system of claim 7, further comprising a seal, which is located in the recess between the filter housing and a downstream surface of the filter.

9. The air sensor system of claim 8, wherein a thickness of the seal defines a tapering profile as it extends away from the filter.

10. The air sensor system of claim 8, wherein the seal comprises one or more ribs that extend away from, and around, an outer surface of the seal, in order to engage with the filter housing.

11. The air sensor system of claim 1, wherein an upstream surface of the filter is flush with an outer surface of the filter housing.

12. An air sensor system comprising:
   a pressure or airflow sensor;
   a filter housing that defines an air flow path to the air pressure sensor; and at least one filter in the air flow path,
the filter comprising:
a micro filter; and
a hydrophobic membrane downstream of the micro filter in the air flow path to the pressure or airflow sensor; and
wherein the at least one filter comprises a plurality of filters located in the filter housing.

13. The air sensor system of claim 12, wherein downstream of each of the plurality of filters is a filter-conduit that connects to a common sensor-conduit, and wherein the sensor-conduit is in fluid communication with the pressure or airflow sensor.

14. An agricultural machine comprising one or more air sensor systems, each comprising:
a pressure or airflow sensor;
a filter housing that defines an air flow path to the air pressure sensor; and
a filter in the air flow path, the filter comprising:
a micro filter; and
a hydrophobic membrane downstream of the micro filter in the air flow path to the pressure or airflow sensor
wherein the filter housing has a recess, and the filter is located in the recess.

* * * * *